(12) United States Patent
Agarwalla (10) Patent No.: US 12,423,674 B2
(45) Date of Patent: Sep. 23, 2025

(54) SECURE QR CODE TRANSACTIONS

(71) Applicant: MASTERCARD INTERNATIONAL INCORPORATED, Purchase, NY (US)

(72) Inventor: Sachin Kumar Agarwalla, Miami, FL (US)

(73) Assignee: MASTERCARD INTERNATIONAL INCORPORATED PURCHASE, Purchase, NY (US)

( * ) Notice: Subject to any disclaimer, the term of this patent is extended or adjusted under 35 U.S.C. 154(b) by 0 days.

(21) Appl. No.: 16/535,984

(22) Filed: Aug. 8, 2019

(65) Prior Publication Data
US 2021/0042732 A1 Feb. 11, 2021

(51) Int. Cl.
G06Q 20/32 (2012.01)
G06K 7/14 (2006.01)
(Continued)

(52) U.S. Cl.
CPC ....... *G06Q 20/3276* (2013.01); *G06K 7/1417* (2013.01); *G06Q 20/3255* (2013.01); *G06Q 20/385* (2013.01); *G06Q 20/227* (2013.01)

(58) Field of Classification Search
CPC .......... G06Q 20/3276; G06Q 20/3255; G06Q 20/385; G06Q 20/227; G06K 7/1417
See application file for complete search history.

(56) References Cited

U.S. PATENT DOCUMENTS 7,505,935 B2 * 3/2009 Mendiola ............... G06Q 40/04
705/37
8,862,513 B2 * 10/2014 Wong ..................... G06Q 20/22
705/39

(Continued)

FOREIGN PATENT DOCUMENTS

AU 2015213383 A1 9/2015
CN 108416400 A 8/2018
(Continued)

OTHER PUBLICATIONS

"International Search Report and Written Opinion Issued PCT Application No. PCT/US2020/042278", Mailed Date: Oct. 8, 2020, 12 Pages.

(Continued)

*Primary Examiner* — Mamon Obeid
*Assistant Examiner* — Pierre L Maccagno
(74) *Attorney, Agent, or Firm* — Talem IP Law, LLP (57) ABSTRACT

A Secure Transaction System can receive a request to initiate a transaction from a payment application. The request can include merchant information obtained from a QR code generated for a merchant. The Secure Transaction System can search a merchant storage resource for corresponding contact information for the merchant identified by the merchant information and communicate a password over a communication channel using the contact information for the merchant. The password sent to the merchant can be provided to the payment application in some manner and the payment application can communicate the password to the Secure Transaction System, which determines whether the verification information satisfies conditions with respect to the password for the merchant and communicates confirmation to the payment application that the transaction can proceed when the verification information satisfies the conditions.

9 Claims, 9 Drawing Sheets

(51) Int. Cl.
*G06Q 20/22* (2012.01)
*G06Q 20/38* (2012.01)

(56) References Cited

U.S. PATENT DOCUMENTS

| | | | | |
|---|---|---|---|---|
| 9,608,988 | B2* | 3/2017 | Kuang | G06F 21/42 |
| 9,665,868 | B2* | 5/2017 | Varadarajan | G06Q 20/385 |
| 9,760,871 | B1 | 9/2017 | Pourfallah et al. | |
| 9,836,741 | B2* | 12/2017 | Varadarajan | H04W 12/06 |
| 2002/0046189 | A1* | 4/2002 | Morita | G06Q 20/3674 |
| | | | | 705/67 |
| 2004/0054632 | A1* | 3/2004 | Remy | G06Q 20/04 |
| | | | | 705/64 |
| 2010/0257102 | A1* | 10/2010 | Perlman | G06Q 30/06 |
| | | | | 705/44 |
| 2012/0203605 | A1* | 8/2012 | Morgan | G06Q 20/3223 |
| | | | | 705/14.51 |
| 2012/0203662 | A1* | 8/2012 | Morgan | G06Q 30/0633 |
| | | | | 705/26.8 |
| 2012/0203673 | A1* | 8/2012 | Morgan | G06Q 30/0207 |
| | | | | 705/27.1 |
| 2012/0255996 | A1* | 10/2012 | Ahmed | G06Q 20/4014 |
| | | | | 235/380 |
| 2013/0124855 | A1* | 5/2013 | Varadarajan | G07F 19/20 |
| | | | | 726/4 |
| 2013/0238500 | A1* | 9/2013 | Moore | G06F 21/34 |
| | | | | 705/44 |
| 2013/0246272 | A1* | 9/2013 | Kirsch | G06Q 20/401 |
| | | | | 705/44 |
| 2013/0262269 | A1* | 10/2013 | O'Leary | G06Q 20/12 |
| | | | | 705/26.81 |
| 2014/0172531 | A1* | 6/2014 | Liberty | G06Q 20/3276 |
| | | | | 705/41 |
| 2014/0207682 | A1 | 7/2014 | Wolfond et al. | |
| 2014/0279474 | A1 | 9/2014 | Evans et al. | |
| 2014/0297533 | A1* | 10/2014 | Mittal | G06Q 20/3224 |
| | | | | 705/44 |
| 2015/0088746 | A1* | 3/2015 | Hoffman | G06Q 20/40145 |
| | | | | 705/44 |
| 2015/0088758 | A1* | 3/2015 | Varadarajan | H04L 9/3234 |
| | | | | 705/71 |
| 2015/0154584 | A1* | 6/2015 | Prashant | G06Q 20/24 |
| | | | | 705/44 |
| 2015/0235219 | A1* | 8/2015 | Murphy, Jr. | G06Q 20/4016 |
| | | | | 705/75 |
| 2015/0278810 | A1* | 10/2015 | Ramatchandirane | |
| | | | | G06Q 20/4015 |
| | | | | 705/16 |
| 2016/0217464 | A1* | 7/2016 | Jajara | G06Q 20/322 |
| 2017/0004507 | A1* | 1/2017 | Henderson | G06Q 20/20 |
| 2017/0302641 | A1* | 10/2017 | Ramatchandirane | |
| | | | | G06Q 20/4012 |
| 2018/0018666 | A1* | 1/2018 | Solanki | G06Q 20/405 |
| 2018/0025352 | A1* | 1/2018 | Kane | G06Q 20/3274 |
| | | | | 705/76 |
| 2018/0039968 | A1* | 2/2018 | Collinge | G06K 7/10722 |
| 2018/0089669 | A1* | 3/2018 | Singh | G06Q 20/385 |
| 2018/0137507 | A1* | 5/2018 | Jayachandran | G06Q 20/401 |
| 2018/0150826 | A1* | 5/2018 | Schwartz | G06Q 20/3223 |
| 2018/0204206 | A1* | 7/2018 | Flurscheim | G06K 19/06037 |
| 2018/0260806 | A1* | 9/2018 | Bhuma | G06Q 20/3226 |
| 2018/0276674 | A1* | 9/2018 | Ramatchandirane | G06Q 20/18 |
| 2019/0122203 | A1* | 4/2019 | Kumawat | G06Q 20/382 |
| 2019/0156167 | A1* | 5/2019 | Singh | G06Q 20/367 |
| 2019/0197527 | A1* | 6/2019 | Agarwalla | G06Q 20/3676 |
| 2019/0220834 | A1 | 7/2019 | Moshal et al. | |
| 2019/0222576 | A1* | 7/2019 | Borkar | H04L 63/0884 |
| 2019/0266600 | A1* | 8/2019 | R | G06Q 20/12 |
| 2019/0306142 | A1* | 10/2019 | Gujral | H04L 67/53 |
| 2020/0034821 | A1* | 1/2020 | Agrawal | H04L 9/3273 |
| 2020/0279245 | A1* | 9/2020 | Venkat | G06Q 20/3274 |
| 2020/0380495 | A1* | 12/2020 | Kang | G06Q 20/4097 |
| 2021/0042732 | A1* | 2/2021 | Agarwalla | G06Q 20/3278 |

FOREIGN PATENT DOCUMENTS

| | | |
|---|---|---|
| IN | 3863/MUM/2015 | 4/2017 |
| WO | 02/08981 A1 | 1/2002 |

OTHER PUBLICATIONS

"SimBanking Visa", Accessed: Feb. 1, 2019, 2 pages, https://crdbbank.co.tz/wp-content/uploads/2018/07/Scan-to-Pay-steps-Website.pdf.

"Bellin GTB Hub App now offers QR code-based account verification", Published: Aug. 2018, 2 pages, https://www.bellin.com/press-release/bellin-introduces-unique-qr-code-fraud-protection-feature/.

* cited by examiner

SECURE QR CODE TRANSACTIONS

BACKGROUND

In recent times, there has been a strong trend towards simplifying payment options to ease checkout. One such advancement that has aided this is the idea of e-wallets, electronic wallets that can store payment card information and transmit the information securely to a vendor. E-wallets can be used to store information from multiple payment cards securely on a device. This information is often encrypted so the data, and thus the money, is safe even if the device is physically stolen. Paying with e-wallets can also be secure: payment information transmitted can be encrypted or tokenized to prevent leakage. Another advantage can be that the data is streamlined—the information sent can be kept to a minimum required to complete the transaction. In particular, this means personal information, such as a customer's name, can be detached entirely from the payment process on the merchant's end, as the verification can be done entirely within the device.

A Quick Response (QR) Code can be used to streamline the process by providing an easy way to communicate to the device the information necessary for the transaction to proceed from the Merchant's side. A QR Code is a matrix barcode that appears as a series of black squares arranged on a white background. The barcode can then be read both horizontally and vertically to extract information—this compact nature allows QR codes to be very information dense and yet still readable by most resolutions of modern cameras. QR codes have been used in the payment process for many years, by providing the necessary information to link a Customer and a Merchant.

BRIEF SUMMARY

Secure QR code transaction systems and processes are described that can help inhibit frauds and scams on QR payments.

A payment application is provided that allows a Customer to select a payment option and to scan a code, such as a QR code, that encodes the Merchant information. The payment application can be executed at the Customer's mobile device. A secure transaction system can receive payment information and Merchant information from the payment application. The secure transaction system can identify the Merchant account from the Merchant information and obtain a pre-registered contact for the Merchant. The secure transaction system can cause a One Time Password (OTP) to be sent to the pre-registered contact for the Merchant. The payment application includes an interface for entering the OTP sent to the Merchant, which is then communicated to the secure transaction system for confirmation. Once confirmed by the secure transaction system, the payment transaction can be carried out.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 5A and 5B illustrate example registration processes.

DETAILED DESCRIPTION

Secure QR code transaction systems and processes are described that can help inhibit frauds and scams on QR payments. It should be understood that while QR codes are expressly described herein, the systems and processes are suitable for other scannable codes that can encode Merchant information. A payment application is provided that allows a Customer to select a payment option and to scan a code, such as a QR code, that encodes the Merchant information. The payment application can be executed at the Customer's mobile device. A secure transaction system can receive payment information and Merchant information from the payment application. The secure transaction system can identify the Merchant account from the Merchant information and obtain pre-registered contact for the Merchant. The secure transaction system can cause a One Time Password (OTP) to be sent to the pre-registered contact for the Merchant. The payment application includes an interface for entering the OTP sent to the Merchant, which is then communicated to the secure transaction system for confirmation. Once confirmed by the secure transaction system, the payment transaction can be carried out.

While use of QR codes and e-wallets can be advantageous in terms of ease of use and speed, such systems can have exploitable security flaws. In the process of a transaction, a Merchant could be defrauded due to the lack of verification on the part of the Customer or vice-versa. The lack of verification in the case of the Merchant being defrauded refers to the unavailability of verifying that funds are available and will be transferred. For example, the Customer receives goods as part of the transaction, but the Merchant may not see their end of the exchange—the funds in an account—until much later, possibly after the Customer leaves the Merchant store. When paying with an e-wallet using a phone, the only signal of receipt can be from the Customer's computing device. If this is the case, the Customer can create a fraudulent success screen that displays at a certain stage of a checkout procedure. The Merchant may see this screen and think that the transaction has been processed and give the Customer the goods, despite no payment actually being in transfer. As a large amount of time may pass before a Merchant can even see that the money will be transferred, simply waiting until the money has successfully transferred can be an unfeasible safeguard against this form of deceit.

On the other hand, a Customer could also be defrauded due to lack of verification that the code being used will direct the funds to the Merchant. The lack of verification in the case of the Customer being defrauded refers to the unavailability of verifying that the recipient is the legitimate one. For instance, a thief could swap a posted QR Code for payment with a QR Code belonging to the thief. During payment, a customer could authorize a payment to the account associated with the QR Code thinking it was legitimate and may not be able to correct the transaction until after the authorization.

The described systems and processes can protect the Merchant and the Customer from some of these frauds and scams.

Figure 1A:
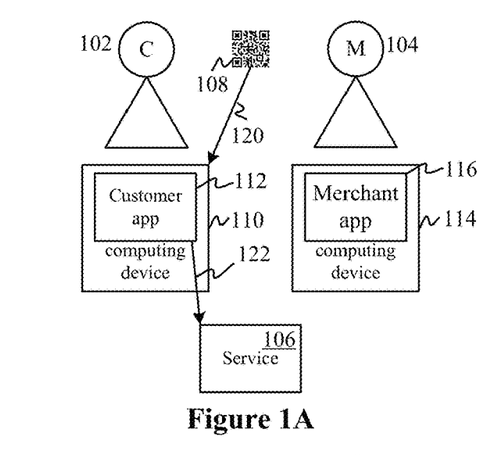
FIGS. 1A-1F illustrate an example transaction flow between a Customer and a Merchant using an example of secure QR code transaction process.

FIGS. 1A-1F illustrate an example transaction flow between a Customer and a Merchant using an example of a secure QR code transaction process. Referring to FIG. 1A, during checkout a Customer 102 may want to pay using their computing device 110. The Customer's computing device 110 may be embodied as described with respect to a computing device 700 of FIG. 7. The Customer's computing device 110 can include a payment application (or Customer application) 112, which can include one or more features of application architecture 200 of FIG. 2. The payment application 112 can be stored and executed partially or entirely on the Customer's computing device 110. The payment application 112 can facilitate the process of paying and includes features to facilitate secure QR Code transactions. The Merchant 104 can generate a QR code 108 through a Merchant application 116 executing at the Merchant's computing device 114. The Merchant application 116 may be a version of the payment application 112 but in merchant mode. The resulting QR code 108 can be displayed via the Merchant's computing device 114. Alternatively, the QR code 108 can be displayed via another computing device or monitor or printed out and made available at a store. The Merchant's computing device 114 may be embodied as described with respect to a computing device 700 of FIG. 7.

Figure 1B:
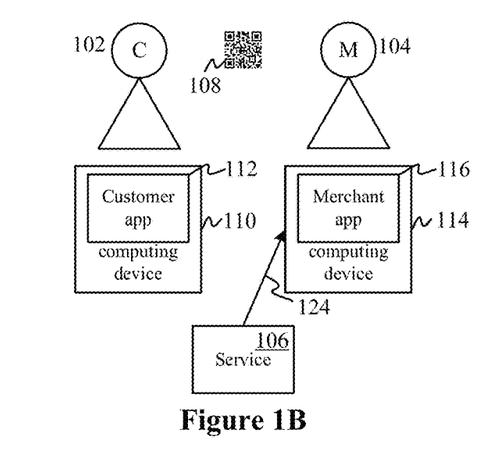

To begin a transaction, the Customer 102 can scan the QR Code 108 using the Customer's computing device 110. The QR Code 108 can be captured (120) using a camera on the Customer's computing device 110 and interpreted by, for example, a QR Scanner module (e.g. 214 of FIG. 2) of the payment application 112. Information that has been decoded by the payment application 112 (e.g., via QR Scanner module 214 of FIG. 2) can be provided (122) to a Secure Transaction Service 106, which may be embodied in a system such as system 800 of FIG. 8. The communication with the Secure Transaction Service 106 can be a request to initiate a transaction, which triggers the security features for transaction. The Service 106 can perform operations such as described with respect to FIG. 6B; and can include one or more features of Service 300 of FIG. 3. Here, the Service 106 can use the information provided by the payment application 112 to search a storage resource for a corresponding contact information for that Merchant, which is then used to communicate (124) a One Time Password (OTP) to the Merchant 104, as illustrated in FIG. 1B.

The OTP is sent through a predetermined channel of contact. For example, the OTP can be sent to the Merchant's 104 phone or email depending on a configuration set by the Merchant 104. The OTP can also be sent to the Merchant 104 through the Merchant application 116 if the Merchant application 116 is actively running on the Merchant's computing device 114.

Figure 1C:
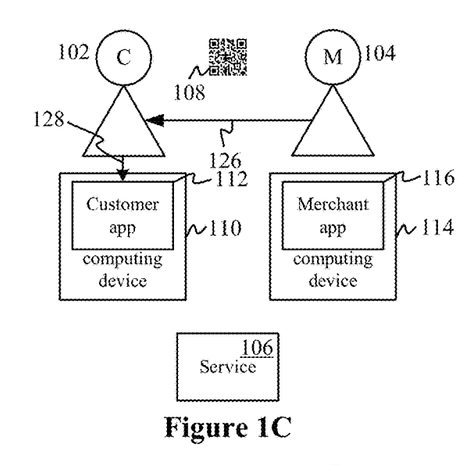

Referring to FIG. 1C, the Merchant 104 can communicate (126) the OTP (e.g., by telling, showing, or transmitting the OTP to the Customer 102) to the Customer 102, who can enter (128) the OTP into the payment application 112 at the Customer's computing device 110.

Figure 1D:
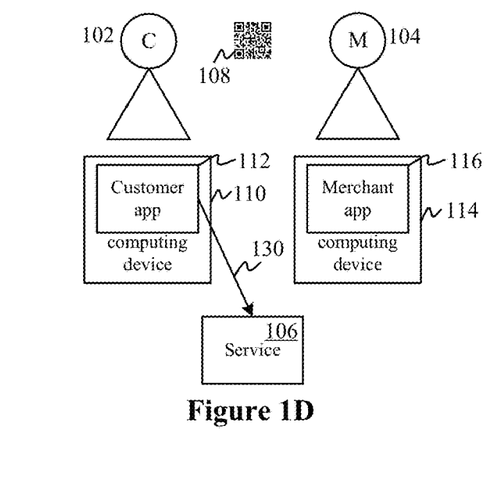

Referring to FIG. 1D, after the OTP is entered into the payment application 112 at the Customer's computing device 110, the payment application 112 can communicate (130) the entered OTP to the Service 106. The Service 106 can check the entered OTP for accuracy, timing, and number of tries. If one or more criteria are satisfied, the transaction can be considered legitimate and proceed.

Figure 1E:
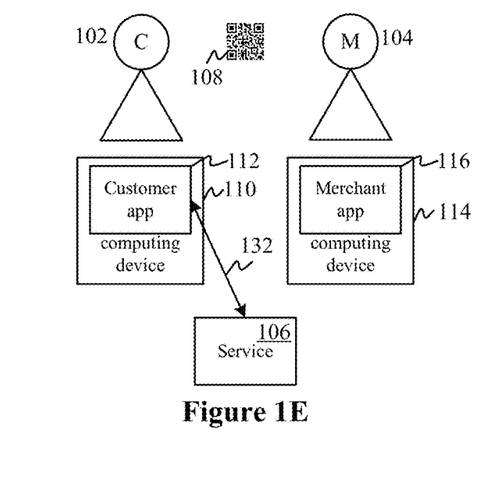

Referring to FIG. 1E, the payment application 112 can request a form of payment from the Customer 102. The Customer 102 can select a desired method of payment from a source, for example from a card stored in a Wallet Storage 220 of FIG. 2 and the payment application 112 can communicate (132) the payment information to the Service 106. In some cases, the Service 106 performs a pre-authorization on the desired form of payment for the Customer 102. If this pre-authorization is valid, then the transaction can occur. In some implementations, the payment selection operations described with respect to FIG. 1E can be performed before or concurrently with the operations described with respect to FIG. 1A.

Figure 1F:
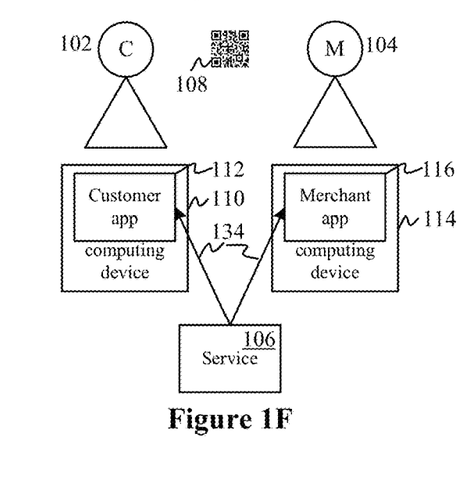

Referring to FIG. 1F, the Customer 102 and, optionally, the Merchant 104 can receive (134) a confirmation that payment has been effected. This confirmation can be sent via the Service 106.

Figure 2:
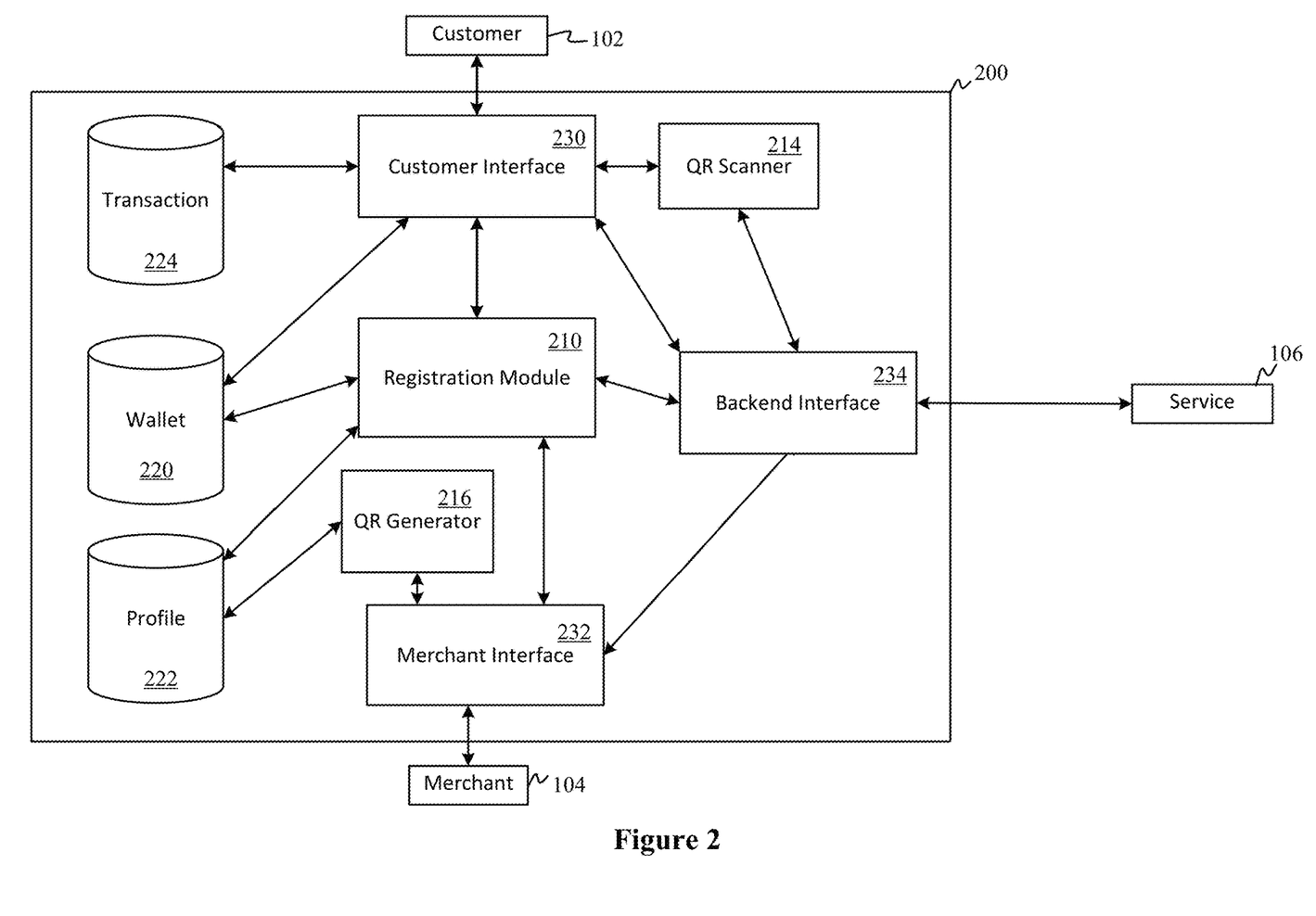
FIG. 2 illustrates an example application architecture enabling secure QR code transactions.

FIG. 2 illustrates an example application architecture enabling secure QR code transactions. The application architecture 200 can include a Registration module 210, a QR Scanner module 214, a QR Generator module 216, a Wallet storage 220, a Profile storage 222, a Transaction storage 224, a Customer interface 230, a Merchant interface 232, and a Backend interface 234. All or some of these elements can be hosted locally on a computing device such as described with respect to the Customer's computing device 110 and Merchant's computing device 114 of FIGS. 1A-1F.

The Registration module 210 can create and populate information in the Wallet storage 220 and Profile storage 222. Using either the Customer interface 230 or the Merchant interface 232, a user can select an option to create a new user profile and initiate the processes carried out by the Registration module 210. The Registration Module 210 can perform operations 500 and 550 such as shown with respect to FIGS. 5A and 5B. The Registration module 210 can be used to create multiple profiles—even for the same user (e.g., a Merchant user can register a profile as a Merchant and a profile as a Customer). The Registration Module 210 can be run automatically upon the first startup of the application (e.g., payment application 112 or 116).

The QR Scanner module 214 can be accessed through the Customer interface 230. The QR Scanner module 214 can interpret a QR Code. A QR Code can be captured through a camera of the computing device the application is running on. The captured QR Code can also be accessed from a storage on the computing device the application (e.g., payment application 112 of FIGS. 1A-1F) is running on. The QR Scanner module 214 can decode information about a Merchant based on the QR code. In some cases, the QR Scanner module 214 is configured to directly launch a transaction by automatically sending decoded information to the Service 106 (e.g., via Backend interface 234). In some cases, the QR Scanner module 214 provides the decoded information for another module (e.g., as part of a payment transaction module-not shown) to communicate the decoded information to the Service 106 (e.g., via Backend interface 234).

The QR Generator module 216 can be accessed through the Merchant interface 232. The QR Generator module 216 can be used to generate and/or obtain the QR Code associated with the Merchant's profile. The QR Generator module 216 can retrieve QR Code data from the Profile storage 222 associated with an active Merchant profile and output a QR Code image. The QR Code image can be exported into various datatypes. In some cases, the QR code image can be rendered at the merchant's device. In some cases, the QR code image can be forwarded to another device via email, SMS, or some other messaging protocol.

The Wallet storage 220 can store information about various payment methods associated with a Customer's account. The stored information can include card type (e.g., Debit, Credit), card brand, card number, expiration date, CVV, name on card, billing address, a note about the card, and an indication of which profile or profiles the card on which the card is usable as some examples. The Wallet storage 220 can be a local storage at the device or an external storage accessed by the device. A visual representation of a graphical user interface displaying content of a Wallet using the information stored in the Wallet storage 220 can be seen in FIG. 4C.

The Profile storage 222 can store information of the user of an account. The stored information can include an account type, such as Customer and Merchant. The stored information for a Customer can further include name and contact information (e.g., email address or phone number). The stored information for a Merchant 104 can include information about the business (e.g., name of the business and location of the business), contact information (e.g., email address or phone number), and any information suitable for encoding for the QR code 108 (and may even store the QR code image). The Profile storage can be a local storage at the device or an external storage accessed by the device.

The Transaction storage 224 can store information about transactions that either occurred on the computing device or are associated with an account on the computing device. The stored information can include information about one or more transactions, including the date, amount, parties involved, and one or more notes.

The Customer interface 230 provides an interface to access and interact with features as a Customer. For instance, a Customer 102 can access the QR Scanner module 214, the Registration module 210, and content/information received from the Service 106. The Customer 102 can also access the Wallet storage 220 and the Transaction storage 224 via the Customer interface 230 to view information associated with the Customer's account or computing device.

The Merchant interface 232 provides an interface to access and interact with features as a Merchant. For instance, a Merchant 104 can access the QR Generator module 216, the Registration module 210, and content/information received from the Service 106.

Figure 3:
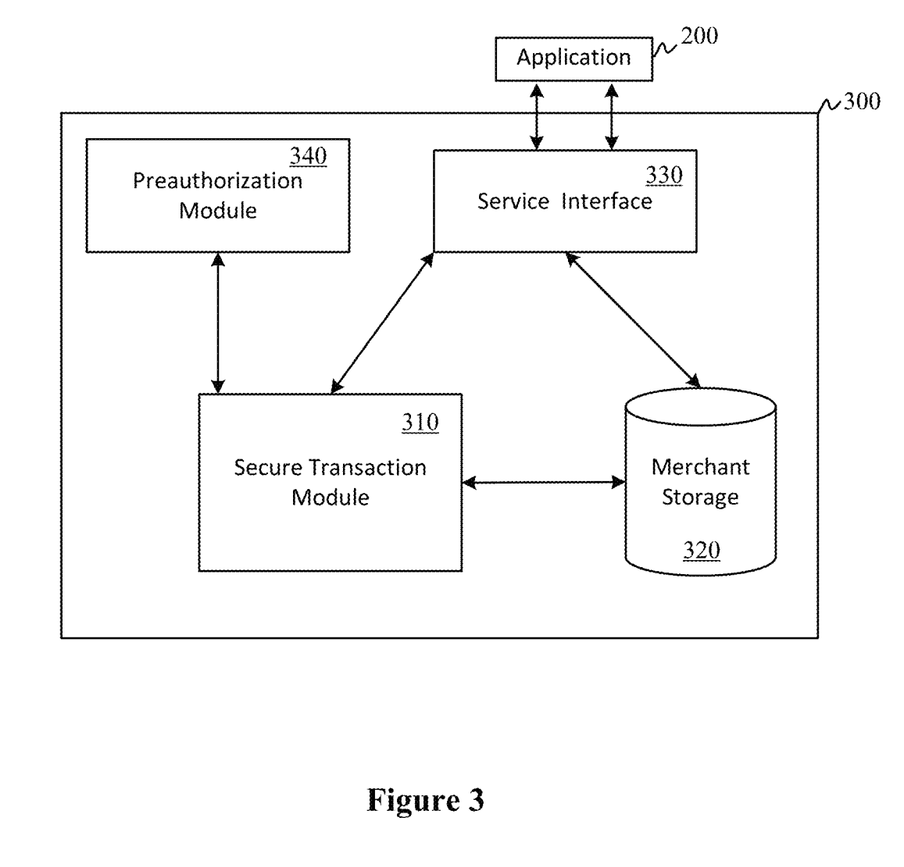
FIG. 3 illustrates a Service enabling secure QR code transactions.

FIG. 3 illustrates a Service enabling secure QR code transactions. The Service 300 can include a Secure Transaction module 310, a Service Merchant storage 320, a Service interface 330, and optionally a Preauthorization Module 340. The Secure Transaction module 310 can implement the processes 650 such as described with respect to FIG. 6B. The Service Merchant storage 320 can store at least the contact information for a Merchant 104. The Secure Transaction module 310 can search the Service Merchant storage 320 for the contact information associated with a Merchant identifier included in the Merchant information received with a request from a payment application (e.g., payment application 112). In some cases, the Service 300 can include a Preauthorization module 340 to facilitate the performing of a preauthorization process on a payment method selected by the Customer 102 (e.g., by affecting conventional preauthorization operations via a payment network).

Figure 4A:
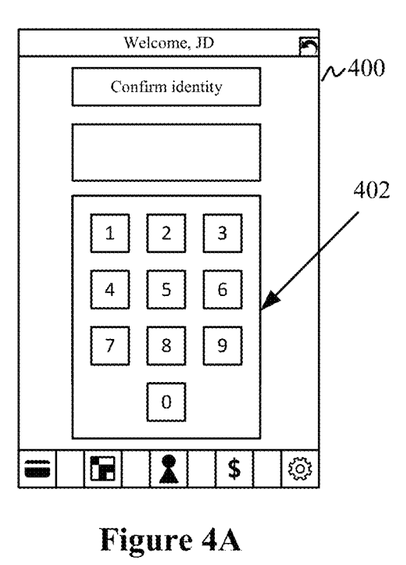
FIGS. 4A-4D FIGS. 4A-4D illustrate simplified views of graphical user interfaces for an application that performs secure QR code transactions.

FIGS. 4A-4D illustrate simplified views of graphical user interfaces for an application that performs secure QR code transactions. Referring to FIG. 4A, when opening the payment application (e.g., payment application 112 of FIGS. 1A-1F), an authentication view 400 can be displayed, prompting a Customer to confirm their identity in order to allow a transaction to be initiated. In the illustrated view 400, a keypad 402 is provided for the Customer to enter their pin. However, other mechanisms may be used for receiving authenticating information, including but not limited to biometrics such as face capture (e.g., from a camera) or fingerprint. The authentication view 400 can be required/surfaced at various steps, including upon launching the application, before selecting a method of payment, before confirming the transaction, or a combination thereof, depending on the implementation. Although a keypad 402 for a purely numeric PIN is illustrated, the PIN may be (and a keypad provided that is) alphanumeric, purely alphabetic, or include other characters in other implementations. If there are multiple accounts locally registered, there may also be an option to switch accounts.

Figure 4B:
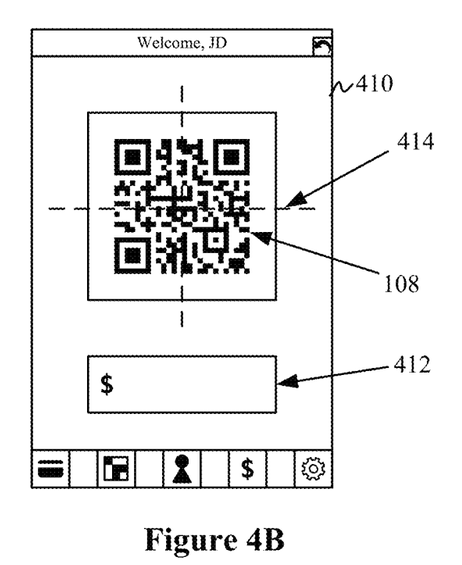

Referring to FIG. 4B, an interface view 410 can prompt a user to capture a QR code 108. In some cases, a field 412 can be provided to enter the amount of the transaction. In some cases, the amount is set by the Merchant and not input via the application in the interface view 410. The interface view 410 can include a viewport region 414 to show the current output of the camera on the device running the application. The QR code 108 may be automatically detected and captured, or the interface view 410 can include an image capture command (not shown).

Figure 4C:
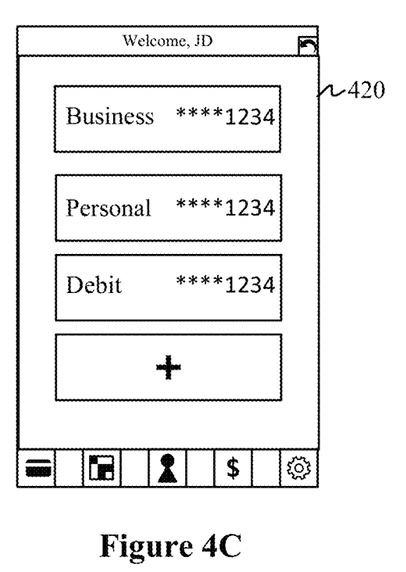

FIG. 4C illustrates a view 420 in which a Customer can select a method of payment from a wallet associated with an account of the Customer. The view 420 can display one or more cards on file in the Wallet storage (e.g., Wallet storage 220 of FIG. 2). The displayed information can include card type, card brand, one or more digits of the card's number, a label for the card (such as 'business' or 'personal'), and a picture. Selecting a card can indicate a Customer's 102 intent to use the card in a currently active transaction. In some cases, a new card can be added in order to use the new card for the transaction. In this example, the user has three payment cards reflected in their electronic wallet.

Figure 4D:
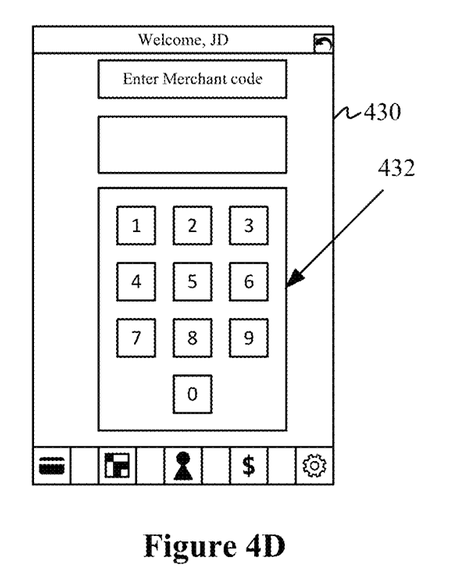

Referring to FIG. 4D, a view 430 can be provided in which the Merchant OTP can be entered, for example via a keypad 432. FIG. 4D illustrates a view for a purely numeric OTP, but the OTP can also be alphanumeric, purely alphabetic, or include other characters in other implementations (and therefore appropriate keypads may be provided). The OTP can also be forwarded digitally and entered automatically in the application in other implementations.

The views of the application can include an active window and a toolbar. The active window can change to the views illustrated in FIGS. 4A-4D depending on the functionality required at the moment and the toolbar can be a static series of graphical links that serve as portals to different functionalities of the application such as a wallet view, a transaction initiation view, a profile view, a transaction history view, and a settings view, as some examples.

Figure 5A:
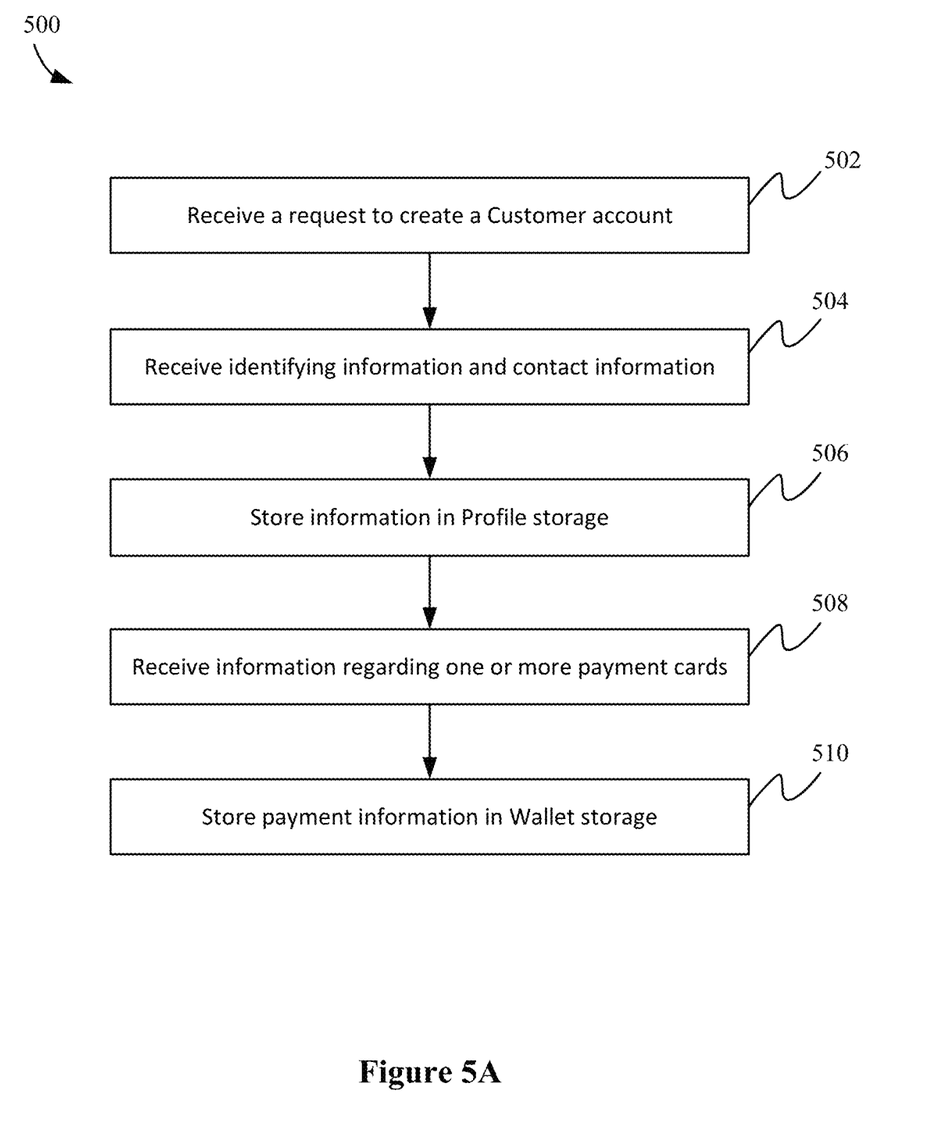
FIG. 5A illustrates an example registration process for a Customer user and FIG. 5B illustrates an example registration process for a Merchant user.
Figure 5B:
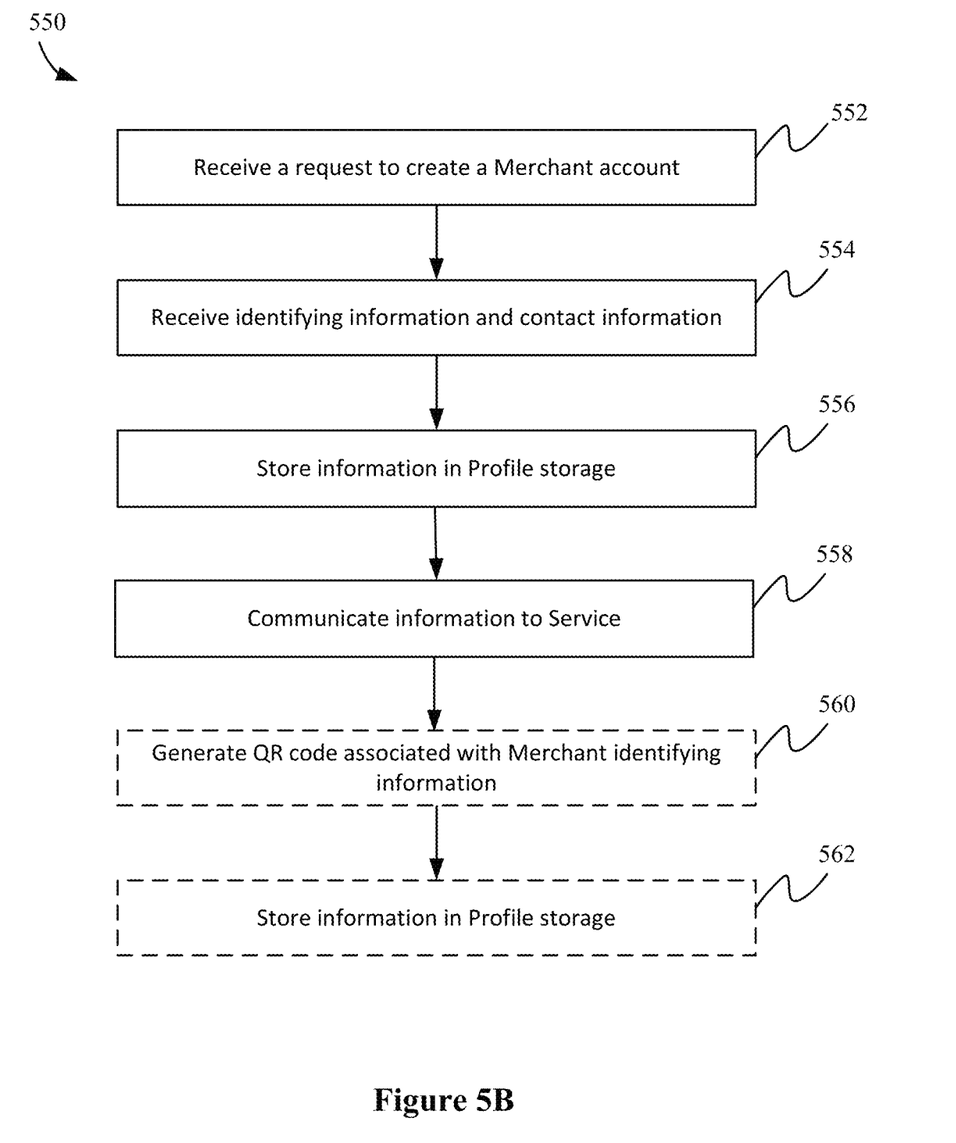

FIGS. 5A and 5B illustrate example registration processes. FIG. 5A illustrates an example registration process for a Customer user and FIG. 5B illustrates an example registration process for a Merchant user. Processes 500 and 550 can be carried out by a Registration module 210 such as shown in FIG. 2. Referring to FIG. 5A, process 500 can begin by receiving a signal from a user that is interpreted as a request to create a customer account (502). This signal can be explicit, such as the user selecting a button, or implicit, such as an automatic launch upon running the application for a first time.

After the request is received, a user can be prompted to input identifying information and contact information. The identifying information and contact information can be received (504) and stored (506) in Profile storage (e.g., Profile storage 222 of FIG. 2). During this part of registration, the user may set up a password or other security measure (e.g., biometric, two-factor authentication, and the like).

The user can also be prompted to enter one or more payment card information. The payment card information can be received (508) and stored (510) in Wallet storage (e.g., Wallet storage 220 of FIG. 2). The user can elect to skip this step. If the user does choose to enter a card, they can enter information such as the card type, card payment brand, card number, expiration date, CVV, name on card, billing address, and the like.

Referring to FIG. 5B, process 550 can begin by receiving a signal from a user that is interpreted as a request to create a Merchant account (552). This signal can be explicit, such as the user selecting a button, or implicit, such as an automatic launch upon running the application for a first time.

After the request is received, a user can be prompted to input identifying information and contact information. The identifying information can be information used to identify the Merchant and may even include account information with respect to where payments to the Merchant are directed. The contact information includes the email, phone, or other communication channel through which the Merchant would like to receive a One-Time Password. The identifying information and contact information can be received (554) and stored (556) in Profile storage (e.g., Profile storage 222 of FIG. 2). This information (including the contact information and at least some of the identifying information) is communicated (558) to the Service for use in the Secure Transaction Services.

In some cases, during registration, a QR code for the merchant can be generated (560) using the Merchant's identifying information. The data to form this QR code and/or the QR code image itself can be stored (562) in the Profile storage.

Figure 6A:
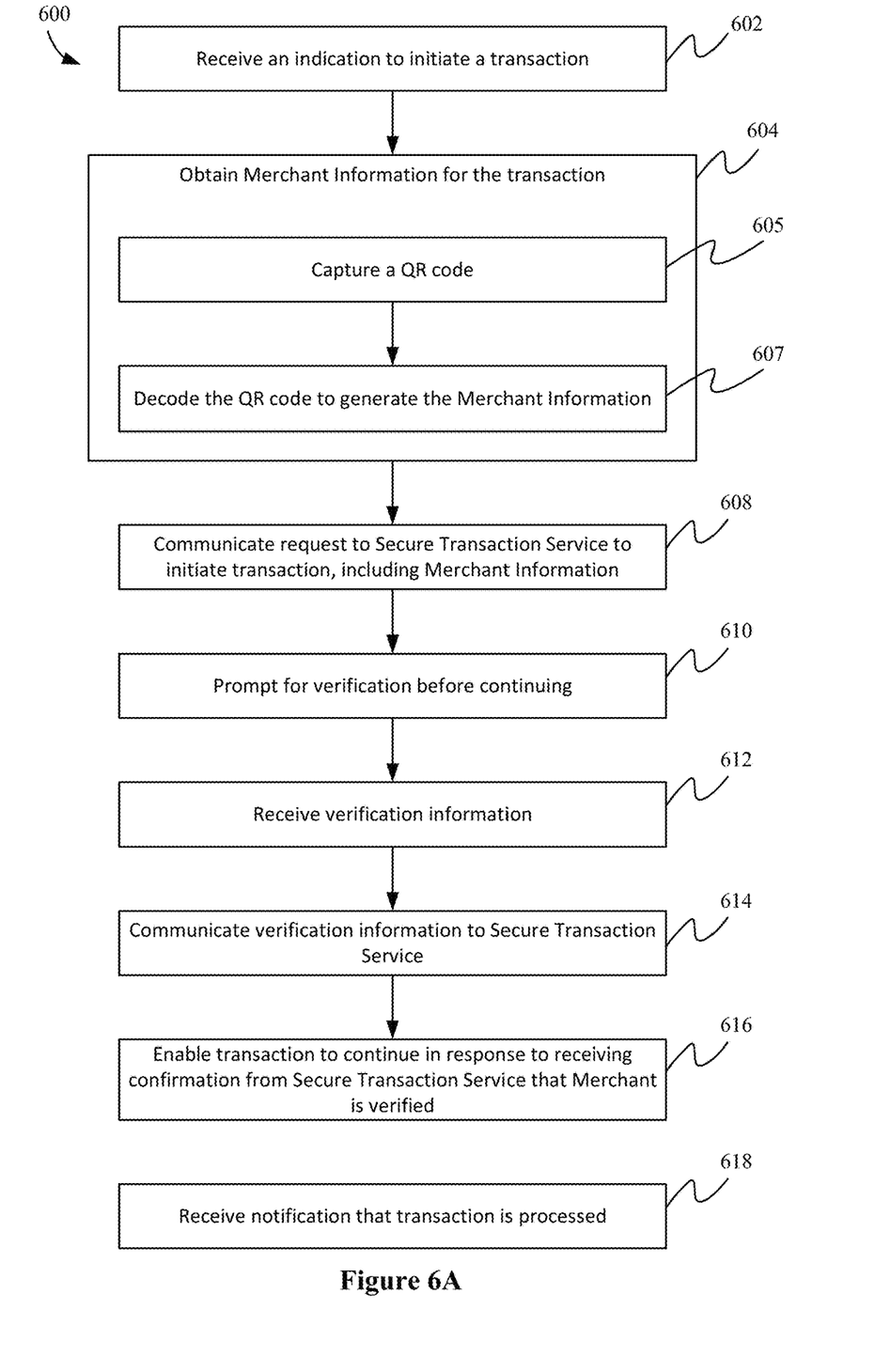
FIG. 6A illustrates a client-side process to perform secure QR code transactions.
Figure 6B:
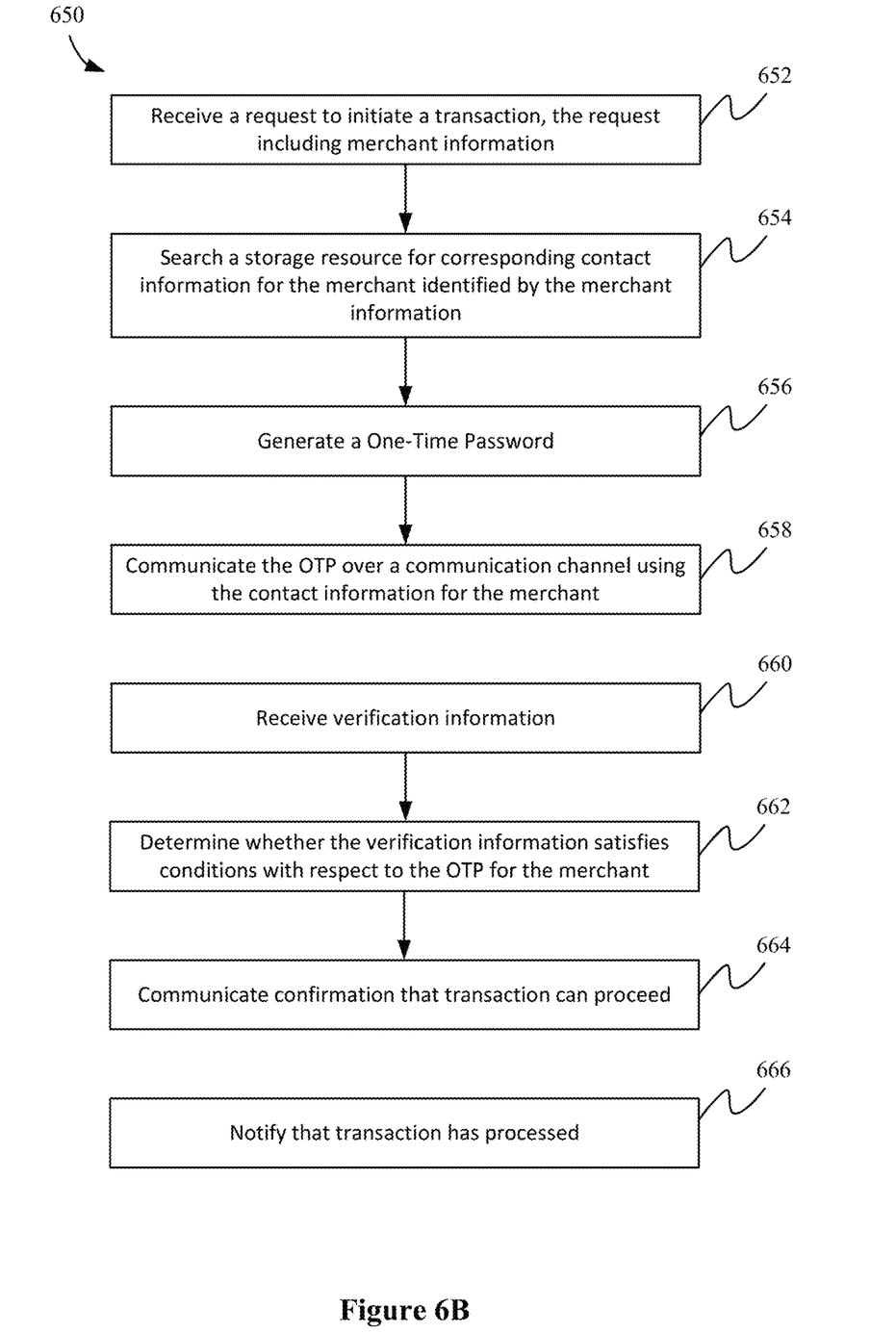
FIG. 6B illustrates a server-side process to perform secure QR code transactions.

FIG. 6A illustrates a client-side process to perform secure QR code transactions; and FIG. 6B illustrates a server-side process to perform secure QR code transactions. Referring to FIG. 6A, an application, such as payment application 112 of FIGS. 1A-1F may include instructions to perform client-side process 600. In some cases, a transaction can be initiated after the user authenticates their identity to the application. An input to initiate a transaction can be received (602). This input may be via a command or menu item in the application. Merchant information is obtained (604) for the transaction. To obtain the merchant information, the application can prompt for the user to capture or otherwise obtain a QR code for the transaction. In some cases, the application can capture (605) the QR code and decode (607) the QR code to generate the merchant information from the QR code. For example, with reference to FIGS. 1A and 2, a QR code 108 can be scanned, photographed, downloaded, or otherwise entered by the Customer's computing device 110; and interpreted, for example, by a QR Scanner module 214 of the payment application 112.

The application can communicate (608) a request to the Secure Transaction Service to initiate a transaction. The request can include at least the Merchant information obtained in operation 604. The application can prompt (610) the user for verification before enabling the process to continue. This verification corresponds to a One-Time-Password (OTP) sent to the Merchant via a predetermined communication channel. The OTP that was sent to the Merchant can be provided for entry into the Customer's application via any suitable method. Once verification information is received (612), the application communicates (614) the verification information to the Secure Transaction Service. The transaction process is enabled (616) to continue upon receipt of confirmation from the Secure Transaction Service that the Merchant is verified. Payment information may be selected and provided to the Secure Transaction Service before or after requiring the verification information to be input. In any case, after the Secure Transaction Service confirms that the Merchant is verified and a pre-authorization is obtained regarding the payment information, the application can receive (618) notification that the transaction is processed.

Referring to FIG. 6B, a Secure Transaction Service, such as Service 106 or 300 may include instructions to perform server-side process 650. Process 650 can begin in response to receiving (652) a request to initiate a transaction (e.g., operation 608 of FIG. 6A). The request to initiate the transaction includes merchant information, which may have been obtained as described with respect to operation 604 of FIG. 6A. The service uses the merchant information to search (654) a storage resource (e.g., Service Merchant storage 320 of FIG. 3) for corresponding contact information for the merchant. In some cases, the merchant information includes a merchant identifier and the merchant identifier is used to look up the corresponding contact information. The contact information can include information on how to communicate with the Merchant to provide a password.

The service can generate (656) the password (either directly or indirectly) and communicate (658) the password over a communication channel using the contact information for the merchant. The password can be any suitable password that can be used as a One-Time Password. The communication channel may be any suitable channel including, but not limited to, telephony, messaging, voice over IP, email, and the like. For example, the service can send the password to the Merchant's payment application (e.g., Merchant application 116) when the payment application includes an authentication module (e.g., functionality that can receive password information). As another example, the service can send the password to a third-party authentication application (e.g., Google Authenticator) that the Merchant has installed on their computing device. As yet another example, the service can send an SMS message via messaging gateways to a messaging application. Further, as yet another example, the service can send an email via email channels for the Merchant to receive via an email application.

At some point after the password is communicated, verification information may be received (660). The service can determine (662) whether the verification information satisfies conditions with respect to the password for the merchant. If the verification information satisfies the conditions, then the service communicates (664) confirmation that the transaction can proceed.

Although not shown in FIG. 6B, the service can receive payment information and can perform pre-authorization processes (e.g., such as described with respect to Preauthorization module 312 of FIG. 3) to determine whether the payment card provided by the Customer is sufficient. For example, the service can receive a PAN and an amount from the Customer (e.g., via payment application 112). In some cases, the payment information is provided with the request to initiate a transaction (e.g., operation 652). In some cases, the payment information is received after there is confirmation that the transaction can proceed (e.g., operation 664). Once payment has been effected for the transaction (and after confirming that the transaction can proceed), the service may send (666) a notification that the transaction has processed.

The notification can be sent directly to the application user interface or can be sent to the Customer 102 and Merchant 104 via the respective contact information. A user could also choose to opt out of notifications, in which case they would not be sent a confirmation.

Figure 7:
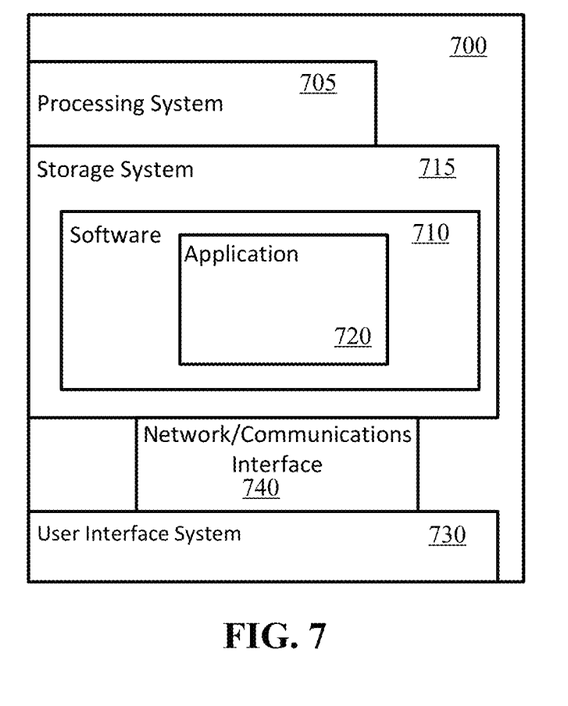
FIG. 7 illustrates components of a computing device through which to perform secure QR code transactions.
Figure 8:
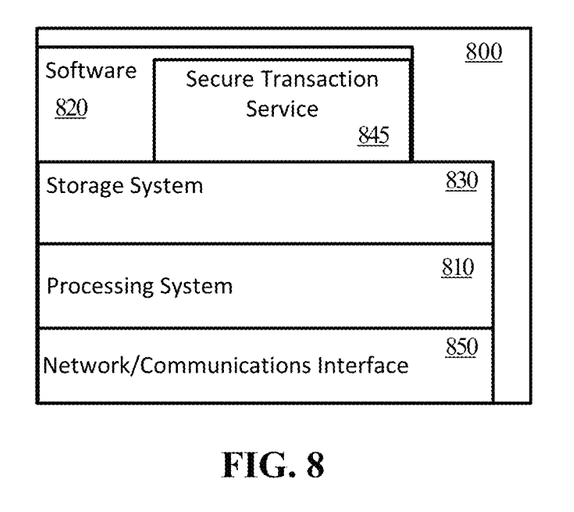
FIG. 8 illustrates components of a system through which to perform secure QR code transactions.

FIG. 7 illustrates components of a computing device through which to perform secure QR code transactions; and FIG. 8 illustrates components of a system through which to perform secure QR code transactions.

Referring to FIG. 7, system 700 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 700 may be incorporated to implement a particular computing device.

System 700 includes a processing system 705 of one or more processors to transform or manipulate data according to the instructions of software 710 stored on a storage system 715. Examples of processors of the processing system 705 include general purpose central processing units, application specific processors, and logic devices, as well as any other type of processing device, combinations, or variations thereof. The processing system 705 may be, or is included in, a system-on-chip (SoC) along with one or more other components such as network connectivity components, sensors, video display components.

The software 710 can include an operating system (not shown) and application programs such as application 720 that communicates with the Secure Transaction Service (e.g., 106, 300) as described herein. Application 720 can include features as described with respect to payment application 112, 116 and application architecture 200.

Device operating systems generally control and coordinate the functions of the various components in the computing device, providing an easier way for applications to connect with lower level interfaces like the networking interface.

Storage system 715 may comprise any computer readable storage media readable by the processing system 705 and capable of storing software 710 including the application 720.

Storage system 715 may include volatile and nonvolatile memories, removable and non-removable media implemented in any method or technology for storage of information, such as computer readable instructions, data structures, program modules, or other data. Examples of storage media of storage system 715 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium (or any storage media described herein) a transitory propagated signal.

Storage system 715 may be implemented as a single storage device but may also be implemented across multiple storage devices or sub-systems co-located or distributed relative to each other. Storage system 715 may include additional elements, such as a controller, capable of communicating with processing system 705.

The system can further include user interface system 730, which may include input/output (I/O) devices and components that enable communication between a user and the system 700. User interface system 730 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input.

The user interface system 730 may also include output devices such as display screen(s), speakers, haptic devices for tactile feedback, and other types of output devices. In certain cases, the input and output devices may be combined in a single device, such as a touchscreen, or touch-sensitive, display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology.

Visual output, including that described with respect to FIGS. 4A-4D, may be depicted on the display (not shown) in myriad ways, presenting graphical user interface elements, text, images, video, notifications, virtual buttons, virtual keyboards, or any other type of information capable of being depicted in visual form.

The user interface system 730 may also include user interface software and associated software (e.g., for graphics chips and input devices) executed by the OS in support of the various user input and output devices. The associated software assists the OS in communicating user interface hardware events to application programs using defined mechanisms. The user interface system 730 including user interface software may support a graphical user interface, a natural user interface, or any other type of user interface. For example, the user interfaces for the application 720 described herein may be presented through user interface system 730.

Network interface 740 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

Certain aspects described herein, such as those carried out by the Secure Transaction Service described herein may be performed on a system such as shown in FIG. 8. Referring to FIG. 8, system 800 may be implemented within a single computing device or distributed across multiple computing devices or sub-systems that cooperate in executing program instructions. The system 800 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 800 can include a processing system 810, which may include one or more processors and/or other circuitry that retrieves and executes software 820 from storage system 830. Processing system 810 may be implemented within a single processing device but may also be distributed across multiple processing devices or sub-systems that cooperate in executing program instructions.

Storage system(s) 830 can include any computer readable storage media readable by processing system 810 and capable of storing software 820. Storage system 830 may be implemented as a single storage device but may also be implemented across multiple storage devices or sub-systems co-located or distributed relative to each other. Storage system 830 may include additional elements, such as a controller, capable of communicating with processing system 810.

Software 820, including that supporting Secure Transaction Service 845, may be implemented in program instructions and among other functions may, when executed by system 800 in general or processing system 810 in particular, direct the system 800 or processing system 810 to operate as described herein for the Secure Transaction Service 845, including features of Service 106 and 300 (and various components and functionality).

System 800 may represent any computing system on which software 820 may be staged and from where software 820 may be distributed, transported, downloaded, or otherwise provided to yet another computing system for deployment and execution, or yet additional distribution.

In embodiments where the system 800 includes multiple computing devices, the system can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network/communication interface 850 may be included, providing communication connections and devices that allow for communication between system 800 and other computing systems (not shown) over a communication network or collection of networks (not shown) or the air.

Certain techniques set forth herein with respect to the application and/or the Secure Transaction Service may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Embodiments may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A Secure Transaction System, comprising:
   a processing system;
   a storage system comprising a merchant storage resource; and
   instructions for secure transactions stored on the storage system that when executed by the processing system, direct the secure transaction system to at least:
      receive, from a payment application of a computing device of a customer, a request to initiate a transaction for the customer, the request comprising merchant information encoded in a QR code that was received by the computing device of the customer via a QR scanner module;
      in response to the request to initiate the transaction from the payment application of the computing device of the customer:
         search the merchant storage resource for corresponding pre-registered contact information for a merchant identified by the merchant information;
         generate a one-time password for the merchant; and
         communicate the one-time password to the merchant over a communication channel of an email or messaging application using the pre-registered contact information for the merchant;

receive, from the payment application of the computing device of the customer, verification information comprising the one-time password previously communicated to the merchant;

determine whether the verification information satisfies conditions with respect to the password for the merchant, the conditions comprising accuracy, timing, and number of tries associated with the password;

receive, from the payment application of the computing device of the customer, payment information for the transaction;

perform a pre-authorization process with respect to the payment information received from the payment application of the computing device of the customer; and after determining that the verification information satisfies the conditions and performing the pre-authorization process, communicate confirmation to the computing device of the customer and the merchant that the transaction has processed.

2. The system of claim 1, wherein the instructions to communicate the one-time password over the communication channel directs the system to communicate an SMS message to the messaging application.

3. The system of claim 1, wherein the instructions to communicate the one-time password over the communication channel directs the system to communicate an email to the email application.

4. The system of claim 1, further comprising instructions that direct the system to:

in response to a pre-registration request providing contact information of the merchant for storing in the merchant storage resource, store the contact information in the merchant storage resource in association with identifying merchant information.

5. A method for secure transactions, comprising:

providing a payment application to a computing device of a customer comprising a QR scanner module and electronic wallet;

pre-registering contact information for a merchant, wherein the pre-registered contact information for the merchant is a third-party authentication application for the merchant, an email, a messaging application contact, or a payment application of the merchant having an authentication module;

receiving, at a secure transaction system from the computing device of the customer, payment information that was received from the electronic wallet of the provided payment application of the computing device of the customer and merchant information encoded in a QR code that was received from the QR scanner module of the provided payment application of the computing device of the customer for performing a transaction;

in response to receiving the payment information and the merchant information from the provided payment application of the computing device of the customer for performing the transaction:

identifying, by the secure transaction system, a merchant account from the merchant information received from the provided payment application of the computing device of the customer and an associated pre-registered contact information for the merchant;

generating, by the secure transaction system, a One-Time Password (OTP) for the merchant; and sending the OTP to the pre-registered contact information for the merchant;

receiving a password via the provided payment application of the computing device of the customer;

confirming timing associated with the password, a number of tries associated with the password, and that the password received via the provided payment application of the computing device of the customer corresponds to the OTP sent to the pre-registered contact information for the merchant;

performing a pre-authorization process with respect to the payment information received from the provided payment application of the computing device of the customer;

after performing the pre-authorization process and confirming the timing associated with the password, the number of tries associated with the password, and that the password received via the provided payment application of the computing device of the customer corresponds to the OTP sent to the merchant, communicating confirmation to the computing device of the customer and to the re-registered contact information for the merchant that the transaction is processed.

6. The method of claim 5, wherein sending the OTP to the pre-registered contact information for the merchant comprises communicating the OTP to the payment application of the merchant having the authentication module.

7. The method of claim 5, wherein sending the OTP to the pre-registered contact information for the merchant comprises communicating the OTP to the third-party authentication application of the merchant.

8. The method of claim 5, wherein sending the OTP to the pre-registered contact information for the merchant comprises communicating an SMS with the OTP to the messaging application contact via a messaging application.

9. The method of claim 5, wherein sending the OTP to the pre-registered contact information for the merchant comprises communicating the OTP to the email of the merchant via an email application.

* * * * *